United States Patent
Zhou (10) Patent No.: US 10,972,624 B2
(45) Date of Patent: Apr. 6, 2021

(54) SMART INTERNET HIGH-DEFINITION SCANNER WITH LASER CORRECTION

(71) Applicant: DALIAN CZUR TECH CO., LTD., Liaoning (CN)

(72) Inventor: Kang Zhou, Liaoning (CN)

(73) Assignee: DALIAN CZUR TECH CO., LTD., Liaoning (CN)

( * ) Notice: Subject to any disclaimer, the term of this patent is extended or adjusted under 35 U.S.C. 154(b) by 0 days.

(21) Appl. No.: 16/806,603

(22) Filed: Mar. 2, 2020

(65) Prior Publication Data
US 2020/0204698 A1    Jun. 25, 2020

Related U.S. Application Data

(63) Continuation-in-part of application No. 16/206,089, filed as application No. PCT/CN2016/086860 on Jun. 23, 2016, now abandoned.

(30) Foreign Application Priority Data

May 31, 2016    (CN) .......................... 201610377419.8

(51) Int. Cl.
*H04N 1/028*    (2006.01)
*H04N 1/00*    (2006.01)

(52) U.S. Cl.
CPC ....... *H04N 1/0282* (2013.01); *H04N 1/00204* (2013.01); *H04N 1/00328* (2013.01); *H04N 1/00827* (2013.01)

(58) Field of Classification Search
None
See application file for complete search history.

(56) References Cited

U.S. PATENT DOCUMENTS

| | | | |
|---|---|---|---|
| 5,760,925 A | 6/1998 | Saund et al. | |
| 2020/0186672 A1* | 6/2020 | Zhou | ...................... H04N 1/387 |

FOREIGN PATENT DOCUMENTS

| | | | |
|---|---|---|---|
| CN | 102170514 A | 8/2011 | |
| CN | 102447810 A | 5/2012 | |
| CN | 103179315 A | 6/2013 | |
| CN | 103595891 A | 2/2014 | |
| CN | 104266605 A | 1/2015 | |
| CN | 104954625 A | 9/2015 | |
| CN | 105095894 A | 11/2015 | |
| CN | 105979117 A | 9/2016 | |
| EP | 1503571 A2 | 2/2005 | |
| JP | 2003-101733 A | 4/2003 | |

* cited by examiner

*Primary Examiner* — Dov Popovici
(74) *Attorney, Agent, or Firm* — Novick, Kim & Lee, PLLC; Allen Xue (57) ABSTRACT

A smart Internet high-definition scanner with laser correction is provided. The scanner may include a calibration laser emission unit located above a scanning area, an image collection unit and an image processing unit. This scanner may collect an image of a page of an unfolded book by using a camera (image collection unit) and a plurality of laser beams directed toward an open book from the calibration laser emission unit.

10 Claims, 10 Drawing Sheets

SMART INTERNET HIGH-DEFINITION SCANNER WITH LASER CORRECTION

CROSS-REFERENCE TO RELATED APPLICATIONS

This application is a continuation-in-part of U.S. patent application Ser. No. 16/206,089, filed on Nov. 30, 2018, which is an U.S. national stage application of PCT international application No. PCT/CN2016/086860, filed on Jun. 23, 2016, which claims the benefit of priority to Chinese application No. 201610377419.8, filed on May 31, 2016, the content of which is incorporated herein by reference in its entirety.

TECHNICAL FIELD

The present invention relates to a smart Internet high-definition scanner with laser correction. The present invention relates to IPC (International Patent Classification) H04 electric communication technique; H04N pictorial communication, e.g. television; H04N1/00 scanning, transmission or reproduction of document or the like, e.g. facsimile transmission, details thereof; H04N1/04 scanning arrangements; H04N1/10 using flat picture-bearing surfaces.

BACKGROUND ART

With the development of video collection and processing technology, the scanner has been upgraded from traditional light-sensitive scanner to a new generation of image collection scanner based primarily on video image collection. This new type of scanner collects a photo of a page through a camera located above the scanned object to complete scan, which eliminates the heavy workload caused by the traditional scanning method of manually pressing a presswork to be scanned on a scanning surface, so as to have the great advantage of fast scanning speed.

However, when such picture collection scanner scans a scanned object having a certain thickness, such as a dictionary or a textbook with a large thickness, a scanning image scanned in the page in the middle of the book may have a large degree of bending, which seriously affects the reading quality, and the bending can have a serious impact on subsequent OCR text recognition.

SUMMARY OF THE INVENTION

A smart Internet high-definition scanner with laser correction disclosed by the present invention regarding to the above problem comprises: a scanning area configured to receive a book to be scanned; a calibration laser emission unit located above the scanning area, an image collection unit and an image processing unit;

wherein the calibration laser emission unit contains one or more line laser emitters which emit one or more laser beam to the book unfolded to a current page and placed on the scanning area during working, and forms a laser line on a surface of the current page;

the image collection unit collects a planar image of a bent page with the laser line; by establishing a three-dimensional coordinate system including a plane of the scanning area;

according to coordinates of pixel points of the laser line and an intersection angle between the laser beam and the plane of the scanning area, height coordinates of each pixel point on the laser line in the planar image in the three-dimensional coordinate system is obtained through tangent function calculation, a 3D curve of the laser line in the three-dimensional coordinate system is restored, and a real 3D curved surface of the page in the three-dimensional coordinate system is constructed according to the 3D curve; and a correlation between points on the 3D curved surface and the pixel points in the planar image is obtained through calculation, pixel values of the points on the 3D curved surface are replaced by pixel values of corresponding pixel points in the planar image, and the 3D curved surface with pixel values replacing is straightened, to complete scanning the current page.

As a preferred embodiment, a side of bottom of the plane of the scanning area is provided with a fixed mount vertical to the plane, and a laser emitter of the calibration laser emission unit and a camera of the image collection unit are respectively fixed in the fixed mount.

Further, the camera is located right above the geometric center of the plane of the scanning area, and a virtual rectangular pyramid is formed by connecting the camera to angles of the plane of the scanning area.

Further, preventing uneven imaging illumination, a light supplementation unit covering the scanning area is further provided. The light supplementation unit is a light source, e.g., a light-emitting diode lamp, which is electrically connected to the master control chip (e.g., MIPS processor), and can be turn on/off by means of a physical switch.

As a preferred embodiment, a calculation process of the height coordinates is as follows:

the image processing unit analyzes the y coordinate of each pixel point on the laser line in the planar image, through calculation to obtain a distance difference value d between a orthographic projection point of an intersection point of each pixel point on the laser line with the curved surface of the page on a scanning platform and an intersection line of the laser beam with the scanning platform, wherein $d=I1-y$ and $I1$ is a distance from the intersection line of the laser beam with the scanning platform to the orthographic projection of a beginning point of the laser beam on the scanning platform; and puts the difference value d and an intersection angle of the laser beam and the scanning platform into a formula (1);

$$f(a,d)=\tan(a)*d \quad (1)$$

through calculation to obtain an actual space height $f(a,d)$ of each pixel point on the laser line in the planar image, which is a z coordinate of the pixel point.

As a preferred embodiment, the image processing unit constructs a virtual plane of each point in the 3D curved surface according to the height coordinate z of the point, and each virtual plane parallels to a subface of the rectangular pyramid which is the plane of the scanning area; calculates an intersection angle between a connecting line, which between the focus of the camera and each point on the 3D curved surface and the virtual plane corresponding to the point;

obtain a distance d from each point to the geometric center of the virtual plane where the point is located through calculation according to the intersection angle, and through calculation to obtain a horizontal coordinate position T of a point on the 3D curved surface corresponding to the pixel point in the planar image according to a following formula;

$$T=P \cdot L/d$$

wherein, L is a distance from an intersection point which between a connecting line (between a focus of the camera right above a geometric center of the scanning platform and a point on the virtual plane) and the plane of the scanning area to the geometric center of the pane of the scanning platform, and P is a coordinate position (x, y) of a 3D pixel in the planar image.

As a preferred embodiment, the image processing unit divides the 3D curved surface filled with pixel value into multiple 3D curves according to a bending direction of the page, arranges the pixel points on the 3D curve along a straight line to complete straightening one 3D curve, replaces the points on a straight line segment formed after straightening at one step by the pixel values of the points with equidistant chord length on the 3D curve, to complete straightening single 3D curve; repeats the above steps to straighten all the straight lines forming the 3D curved surface, and combines all the straight line segments to completely straighten the 3D curved surface.

In some implementations, the image processing unit may be a computing device having a CPU, e.g., a MIPS processor with DSP (Digital Signal Processing), and a memory. The memory may be loaded with a software that contains instructions to implement the image process method of this disclosure. The MIPS processor may be embedded with instructions to integrate the imaging and image processing methods.

In a preferred embodiment, the smart Internet high-definition scanner with laser correction further comprises a communication unit for transmitting a flat page image finally obtained through scanning or the planar image collected initially to an external device. The communication unit contains circuitry and devices (e.g., USB peripherals) that operatively connect the CPU in the imaging processing unit using LibUSB and LibUVC protocols. The communication unit may also contain circuitry, receivers, transmitters that communicate wirelessly with the imaging processing unit, e.g., through Bluetooth or WiFi.

In another preferred embodiment, the smart Internet high-definition scanner with laser correction further comprises a display unit that is a display arranged on the top of the scanner. The display can be an LED display or an LCD display, which is configured to show the image to be scanned and to provide an user interface. The display is operatively connected to the CPU, e.g., the MIPS processor.

Further, the system is connected to a storage unit and/or an external storage unit. The storage unit contains a memory (e.g., Nand Flash or TF card) that stores the image data files.

BRIEF DESCRIPTION OF THE DRAWINGS

In order to more clearly illustrate the technical solutions in the embodiments of the present invention or the prior art, the drawings to be used in the embodiments or the description of the prior art will be briefly introduced below. Obviously, the drawings in the following description merely indicate some embodiments of the present invention, and those skilled in the art can further obtain other drawings according to these drawings without going through any creative work.

DETAILED DESCRIPTION OF THE PREFERRED EMBODIMENTS

In order to make the objects, the technical solutions and the advantages of the embodiments of the present invention clearer, the technical solutions in the embodiments of the present invention are clearly and completely described with reference to the drawings in the embodiments of the present invention.

As shown in FIG. 1 to FIG. 6, a smart Internet high-definition scanner with laser correction mainly comprises a set scanning area and a scanner with an image collection camera.

A plane of a certain size bearing the scanner can be directly used as the scanning area, such as a desk surface or a work surface where the scanner is placed. A special support plate unfolded by a certain angle can also be used to better guarantee that, after a certain thickness of the pages of the book are opened, the pages are still kept in an opened state under the deadweight thereof, which can save an external force for pressing a thicker book.

Preferably, a planar scanning area is defined as a rectangular area with a fixed size.

The core optical components of the scanner mainly comprise a calibration laser emission unit and an image collection unit. The calibration laser emission unit includes one or more laser emitters. The image collection unit has a camera that can collect pictures and/or continuous frame sequence images to form a video in general. An imaging focus of the camera is located right above a geometric center of the rectangular scanning area. Preferably, as shown in the drawings, the camera is fixed through an L-shaped support, and the calibration laser emission unit is arranged at the bending part of the L-shaped support.

Figure 1:
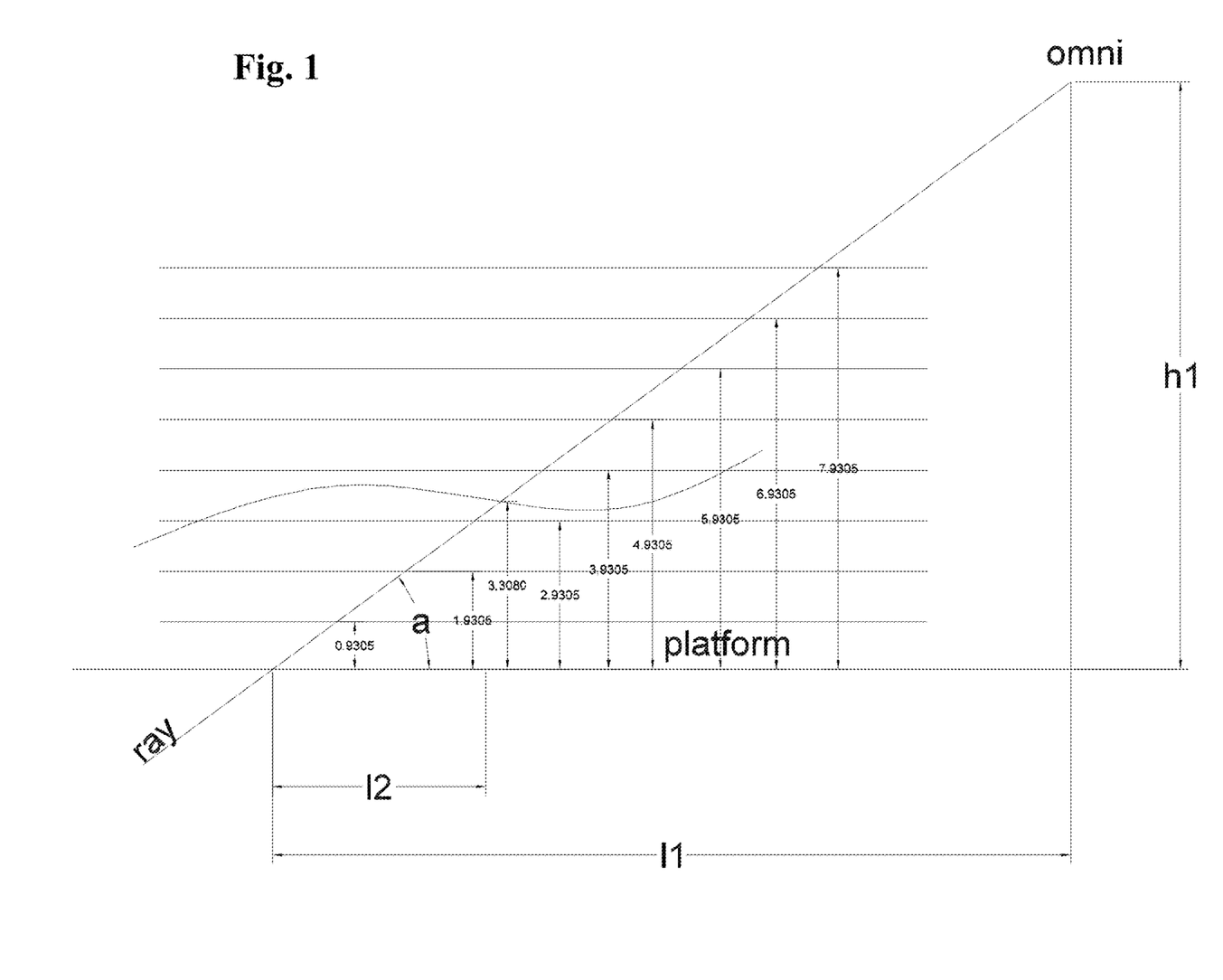
FIG. 1 is a calibration schematic diagram of the present invention
Figure 2:
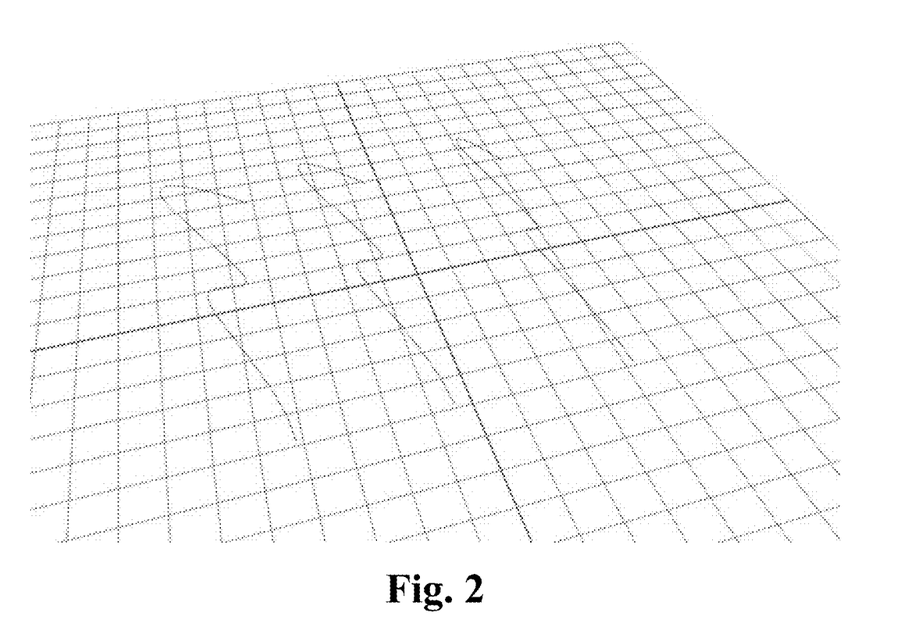
FIG. 2 is a schematic diagram of 3D curves constructed by the present invention.
Figure 3:
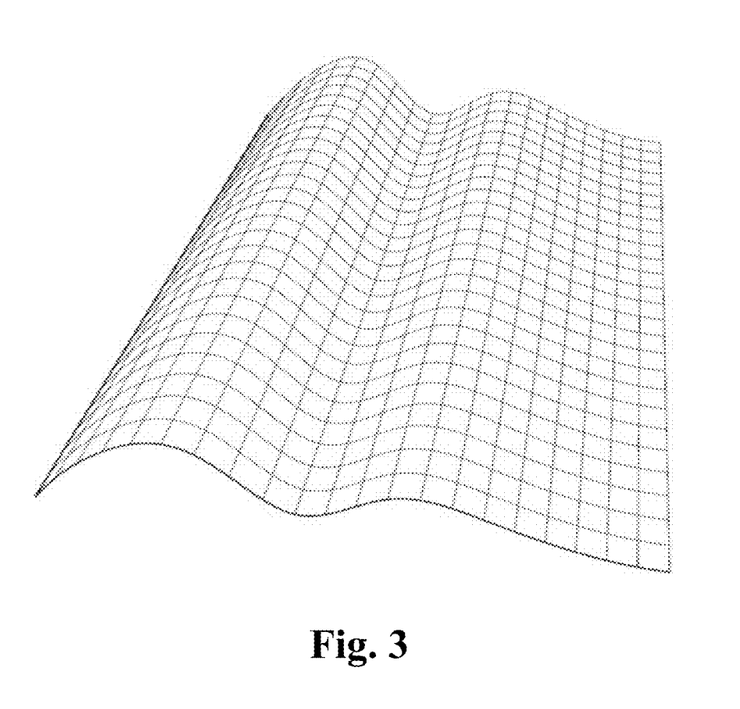
FIG. 3 is a schematic diagram of a 3D curved surface constructed by the present invention.
Figure 4:
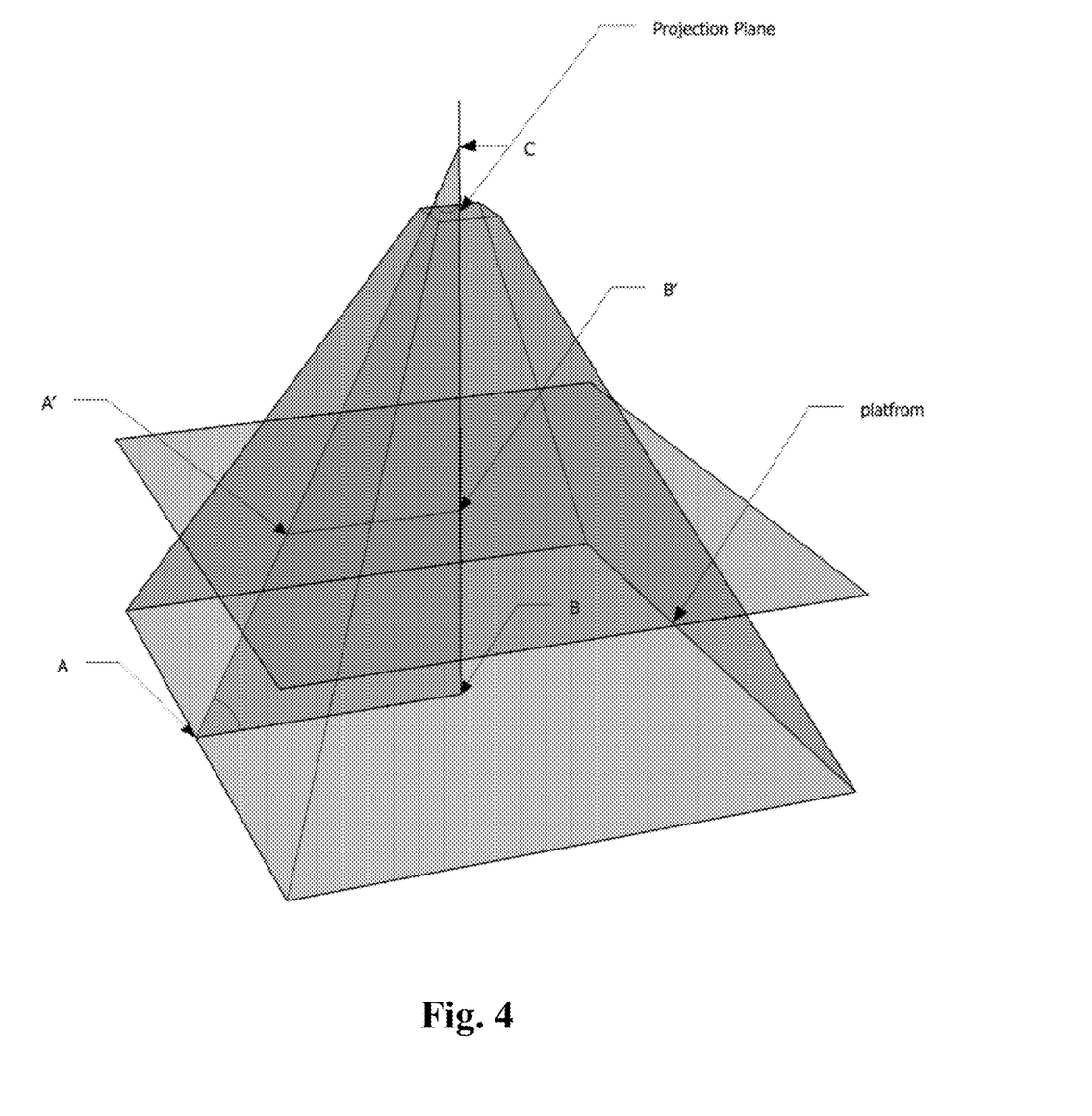
FIG. 4 is a schematic diagram illustrating the calculation of a projection coefficient of the present invention.
Figure 5:
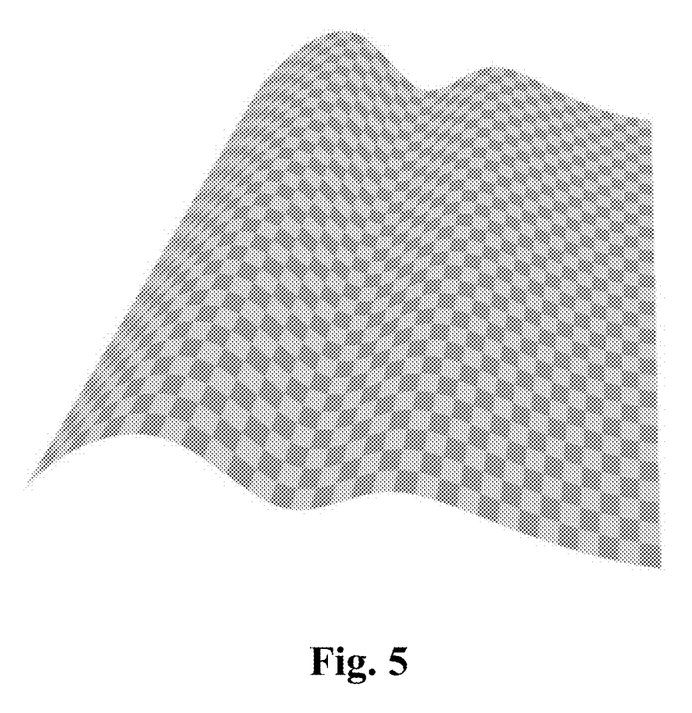
FIG. 5 is a schematic diagram of the 3D curved surface with contents after pixel conversion.
Figure 6:
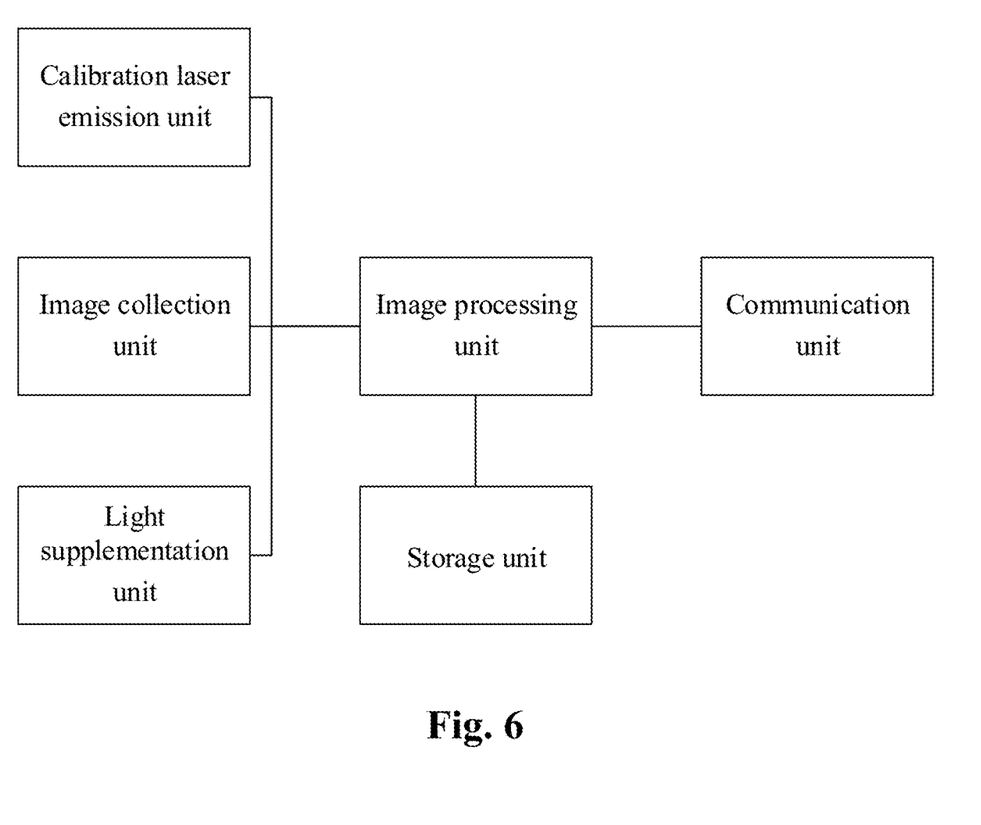
FIG. 6 is a system module diagram of the present invention.

In order to facilitate subsequent calculation, as a preferred embodiment, a focus of the camera is set to be located right above the plane of the scanning area; and an acute angle is formed between a plurality of laser beams emitted by the calibration laser emission unit and the plane of the scanning area, which is an angle a as shown in FIG. 1.

A line laser emitter capable of emitting planar fan-shaped laser beams is selected as the laser emission unit to ensure that the laser beam projected on the plane of the scanning area finally forms straight laser line, and the angle between the line laser beam plane and the scanning table plane is measured by the method in the present disclosure to calculate the height. Preferably, the embodiments of the present invention comprise three laser emitters capable of emitting three laser beams to the plane of the scanning area to form three mutually parallel laser lines that are also parallel to a subface of a rectangular area set by the algorithm, and in order to be able to adapt to the form of general book, the laser lines are parallel to a long side of the rectangular area.

Meanwhile, an angle of the rectangular area is selected as an original point to establish a three-dimensional coordinate system, the long side of the rectangular area is x axis, a short side of the rectangular area is y axis, a vertical height is z axis, and meanwhile, a virtual rectangular pyramid is formed by connecting the focus of the camera to four angles of the rectangular area.

Although a plurality of laser beams obviously conduce to improving the accuracy of operation, one laser beam or one laser line can also satisfy the requirement of subsequent algorithm, particularly the requirement of constructing 3D curved surfaces.

When a L-shaped support with a fixed height is used, the preset steps above can be stored in the storage unit in the system; when the L-shaped support with adjustable height is used, or the adjustable support plate above is used, the steps above can be obtained by the system through self-calibration after the computer is turned on, and some of the parameters, such as the definition of the scanning area, can also be manually set.

Turn the book to a specified number of pages, and place it flat in the rectangular scanning area, since the subsequent algorithm is the calculation based on the pixel points in the image, an edge of the book does not need to be parallel to the side of the rectangular area in the operation of this step.

In order to prevent the ambient light brightness from affecting the imaging quality and brightness, and avoid the L-shaped support from generating a shadow on the page, thereby affecting the algorithm identification, as a preferred embodiment, a light supplementation unit capable of covering the entire plane of the scanning area is further arranged around the camera, which is turned on during scanning to remove possible light influence factors.

In the scanning process, the laser beam forms a curve on the surface of the page of opened book, the planar image with the curve is collected, the image processing unit analyzes the y coordinate of each pixel point on the laser line in the planar image, obtains a distance difference value d between a positive projection point, which is an intersection point of each pixel point on the laser line with the curved surface of the page on a scanning platform, and an intersection line of the laser beam with the scanning platform through calculation, wherein d=I1 and I1 is a distance from the intersection line of the laser beam with the scanning platform to the positive projection of a beginning point of the laser beam on the scanning platform; and puts the difference value d and the intersection angle of the laser beam and the scanning platform into formula (1);

$$f(a,d)=\tan(a)*d \quad (1)$$

through calculation to obtain an actual space height f(a,d) of each pixel point on the laser line in the planar image, which is a z coordinate of the pixel point.

The image processing unit constructs a virtual plane of each point in the 3D curved surface according to the height coordinate z of the point, and each virtual plane parallels to a subface of the rectangular pyramid which is the plane of the scanning area, wherein the virtual plane is a height plane where the point is located;

and calculates an intersection angle between a connecting line which between the focus of the camera and each point on the 3D curved surface and virtual plane corresponding to each point; and through calculation to obtains a distance d from each point to the geometric center of the virtual plane where the point is located through calculation according to the intersection angle, and obtains a horizontal coordinate position T of a point T on the 3D curved surface corresponding to the pixel point in the planar image according to the following formula;

$$T=P \cdot L/d$$

wherein, L is a distance from an intersection point which between a connecting line (between a focus of the camera right above a geometric center of the scanning platform and a point on the virtual plane) and the plane of the scanning area to the geometric center of the plane of the scanning platform, and P is a coordinate position (x, y) of a 3D pixel in the planar image.

Points on the 3D curved surface and corresponding pixel points in the planar image are found according to the horizontal coordinate position. That is, a correlation is found. Pixel values of the points on the 3D curved surface are replaced by pixel values of corresponding pixel points in the planar image.

The image processing unit divides the 3D curved surface filled with pixel value into multiple 3D curves according to a bending direction of the page, arranges the pixel points on the 3D curve along a straight line to complete straightening one 3D curve, replaces the points on a straight line segment formed after straightening at one step by the pixel values of the points with equidistant chord length on the 3D curve, to complete straightening single 3D curve; repeats the above steps to straighten all the straight lines forming the 3D curved surface, and combines all the straight line segments to completely straighten the 3D curved surface. Finally, the scanning of current page is completed to obtain a flat scanning picture without bending.

In order to be able to transmit the final obtained scanning image to an external device, the system is also provided with a communication unit. As a preferred embodiment, the communication unit integrates a wireless communication module and a wired communication module, for example, the scanning picture is transmitted to the outside through a Wi-Fi module or a USB communication module.

As a preferred embodiment, a display unit is further arranged on an upper surface of the L-shaped support for displaying the initial planar image and the scanning image of the page obtained after the algorithm processing.

Figure 7:
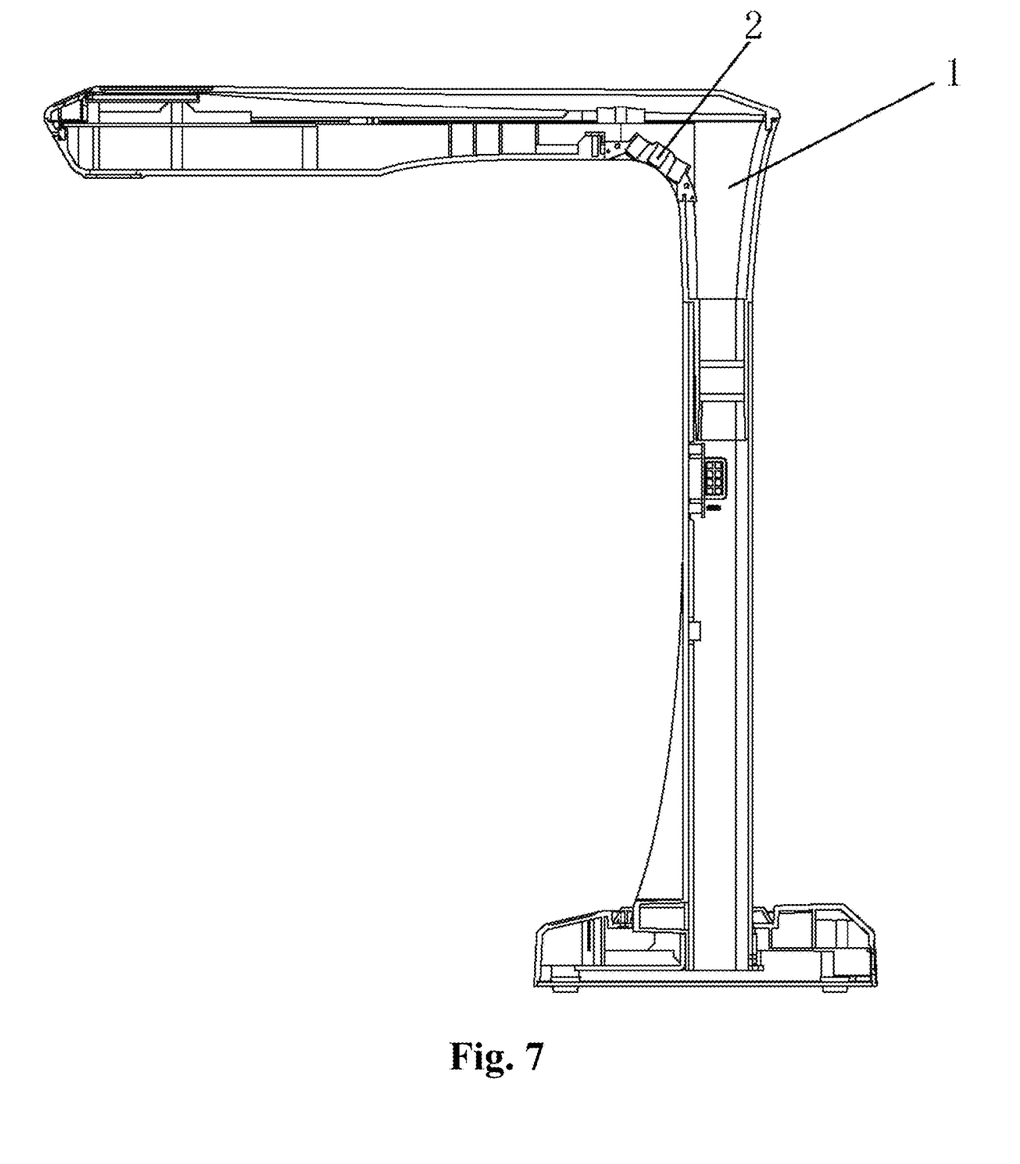
FIG. 7 is a side view of an entity structure according to embodiment 1 of the present invention.
Figure 8:
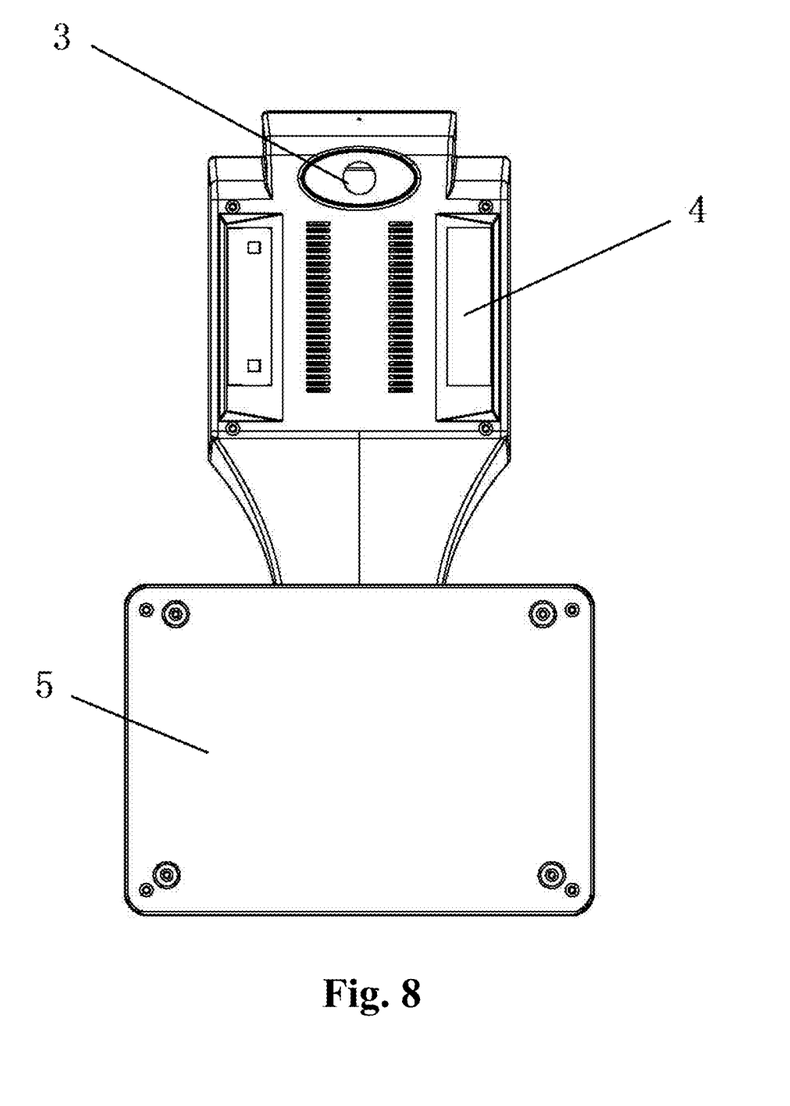
FIG. 8 is a bottom view of the entity structure according to embodiment 1 of the present invention.
Figure 9:
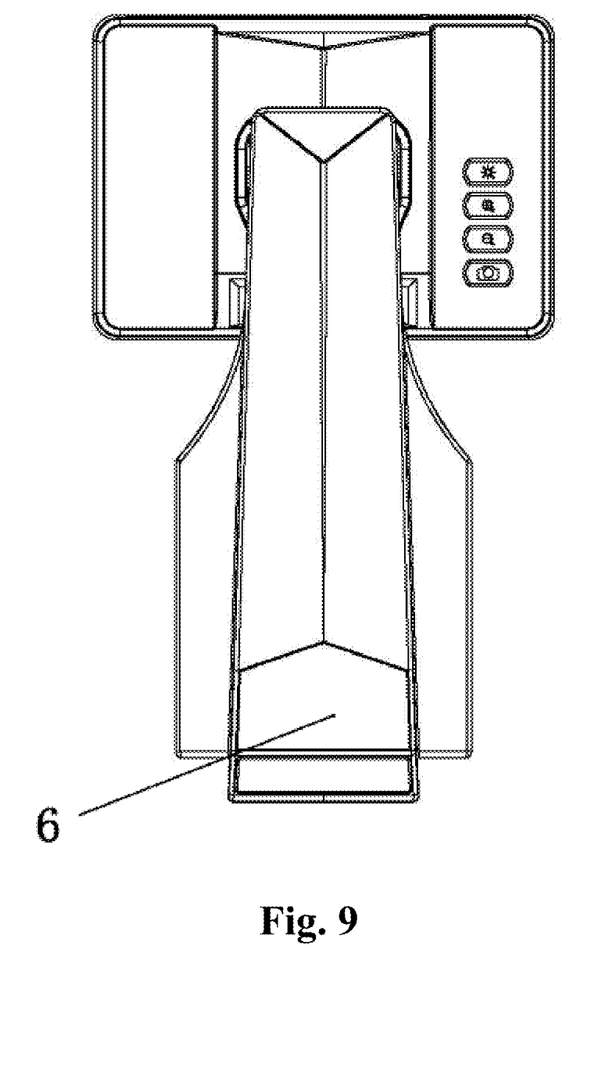
FIG. 9 is a top view of the entity structure according to embodiment 1 of the present invention.

Embodiment 1, as shown in FIGS. 7 to 9: the scanner mainly comprises an L-shaped support 1 and a counterweight base 5, and three laser emission components 2 are arranged at a corner of the L-shaped support 1. A front end of a transverse arm of the L-shaped support 1 is provided with a camera 3, and a light supplementation of LED 4 is arranged behind the camera. In order to facilitate the real-time monitoring of the user, especially off-line (which is not applicable to an external display) monitoring scanning process, an upper surface of the front end of the L-shaped support 1 is provided with a display 6, which facilitates monitoring current scanning state at any time. A surface of the counterweight base 5 is provided with an adjustment button.

Figure 10:
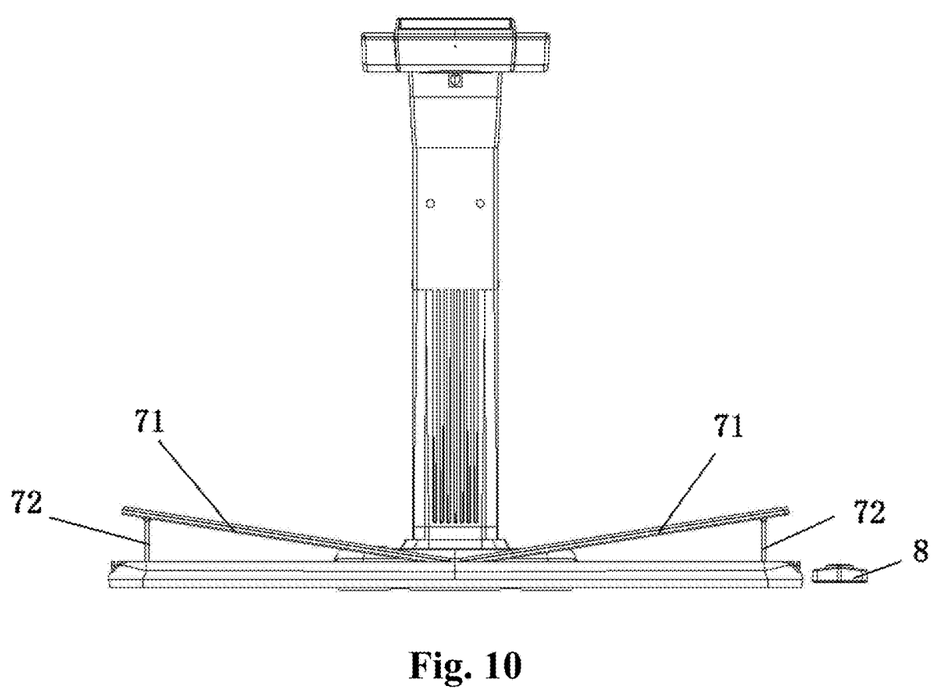
FIG. 10 is a front view of the entity structure according to embodiment 2 of the present invention.
Figure 11:
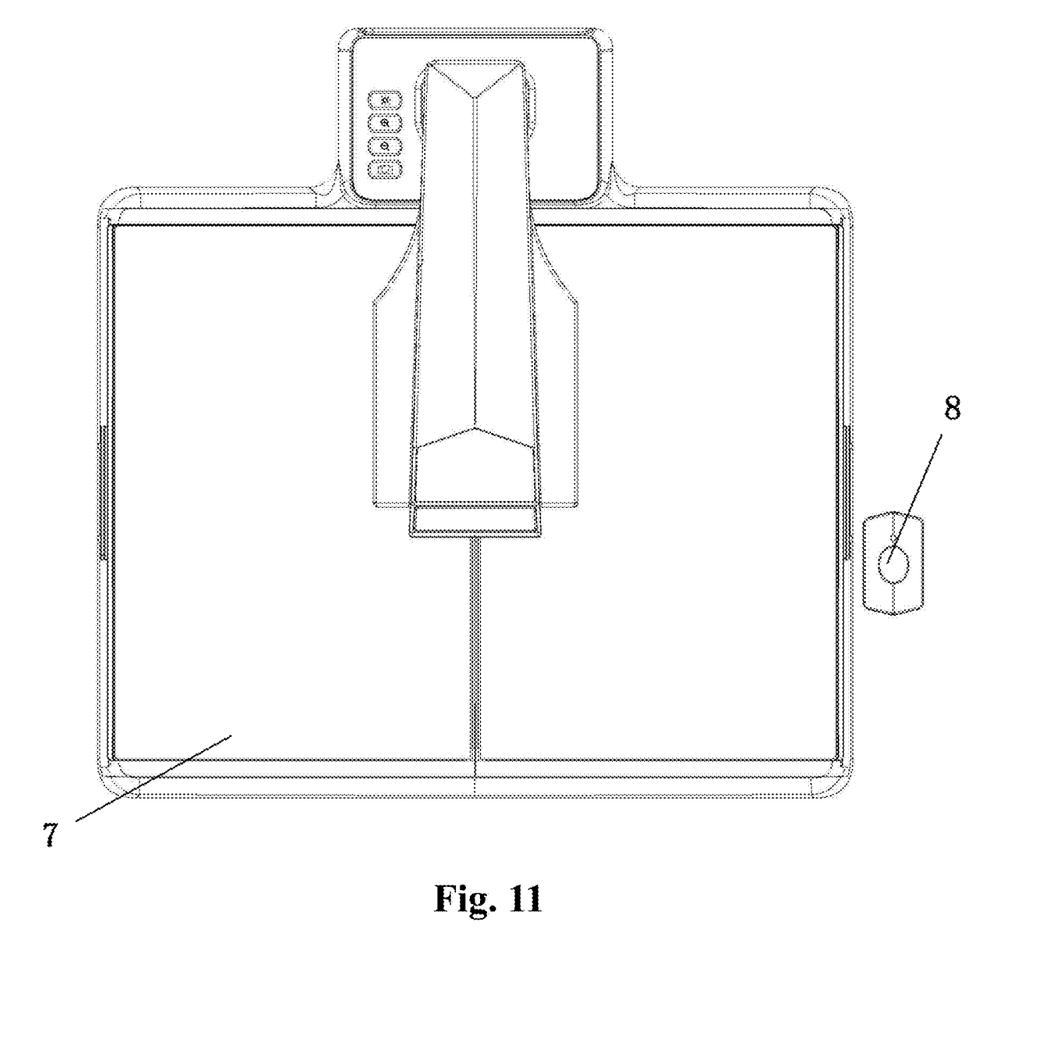
FIG. 11 is a top view of the entity structure according to embodiment 2 of the present invention.

Embodiment 2, as shown in FIGS. 10 to 11, similar to embodiment 1, and the distinction lies in having a marked scanning area 7. In embodiment 1, a size, an area and a position of the camera 3 or a virtual scanning area set by the system are the same as that of the scanning area 7.

The scanning area 7 comprises two oppositely arranged support plates 71, the support plate has a adjustable elevation angle and can be moved left and right, so as to ensure that the book is able to be in an opened state under the effect of self-weight. Meanwhile, the left and right movement can ensure a middle line of the book (a separation line between two pages) is always located right below the focus of the camera 3, which facilitates obtaining planar images of two pages through the algorithm respectively.

A controller 8 is further provided, which can be connected to (communicated with) a system host by a wireless or wired connecting method, to facilitates controlling a photographing rhythm of the camera 3 by the user.

The forgoing is only preferred detailed embodiments of the present invention, but does not limit the protection scope of the present invention. The equal replacement or amendment made by any skilled in the art in the technical scope disclosed by the present invention according to the technical solutions and the inventive concept of the present invention shall fall with the protection scope of the present invention.

The invention claimed is:

1. A smart Internet high-definition scanner with laser correction, comprising:
   a scanning area configured to receive a book to be scanned;
   a calibration laser emission unit located above the scanning area;
   a camera; and
   an image processing unit,
   wherein the calibration laser emission unit emits a laser beam to the book unfolded to a current page and placed on the scanning area to form a laser line on a surface of the current page;
   wherein the camera collects a planar image of the current page with the laser line by establishing a three-dimensional coordinate system including a plane of the scanning area;
   wherein according to coordinates of pixel points of the laser line and an intersection angle between the laser beam and the plane of the scanning area, the image processing unit obtains height coordinates of each pixel point on the laser line in the planar image in the three-dimensional coordinate system through calculation of tangent function, the image processing unit restores a 3D curve of the laser line in the three-dimensional coordinate system, and the image processing unit constructs a 3D curved surface of the current page in the three-dimensional coordinate system according to the 3D curve; and
   wherein the image processing unit obtains a correlation between points on the 3D curved surface and the pixel points in the planar image through calculation, the image processing unit replaces pixel values of the points on the 3D curved surface with pixel values of corresponding pixel points in the planar image, and the image processing unit straightens the 3D curved surface with the replaced pixel values, to complete scanning the current page.

2. The smart Internet high-definition scanner with laser correction according to claim 1, wherein:
   a side of bottom of the plane of the scanning area is provided with a fixed mount vertical to the plane of the scanning area, and
   the calibration laser emission unit and the camera are respectively fixed to the fixed mount.

3. The smart Internet high-definition scanner with laser correction according to claim 2, wherein the camera is located above a geometric center of the plane of the scanning area, and a virtual rectangular pyramid is formed by connecting the camera to angles of the plane of the scanning area.

4. The smart Internet high-definition scanner with laser correction according to claim 1, wherein light emitting diodes emit light covering the scanning area.

5. The smart Internet high-definition scanner with laser correction according to claim 1, wherein:
   the image processing unit analyzes a y coordinate of each pixel point on the laser line in the planar image, through calculation to obtain a distance difference value d between a orthographic projection point of an intersection point of each pixel point on the laser line with the 3D curved surface of the current page on a scanning platform and an intersection line of the laser beam with the scanning platform; wherein d=l1−y, and l1 is a distance from the intersection line of the laser beam with the scanning platform to the orthographic projection point of a beginning point of the laser beam on the scanning platform; and puts the difference value d and an intersection angle of the laser beam and the scanning platform into a formula (1);

$$f(a,d)=\tan(a)*d \quad (1)$$

through calculation to obtain an actual space height f(a,d) of each pixel point on the laser line in the planar image, which is a z coordinate of the pixel point.

6. The smart Internet high-definition scanner with laser correction according to claim 3, wherein:
   the image processing unit constructs a virtual plane of each point in the 3D curved surface according to a z coordinate of the point, and each virtual plane parallels to a subface of the virtual rectangular pyramid which is the plane of the scanning area; calculates an intersection angle between a connecting line between a focus of the camera and each point on the 3D curved surface and the virtual plane corresponding to the point;
   the image processing unit obtains a distance d from each point to a geometric center of the virtual plane where the point is located through calculation according to the intersection angle, and through calculation to obtain a horizontal coordinate position T of a point on the 3D curved surface corresponding to the pixel point in the planar image according to a following formula;

$$T=P \cdot L/d$$

wherein L is a distance from an intersection point which between a connecting line between a focus of the camera right above a geometric center of a scanning platform and a point on the virtual plane and the plane of the scanning area to the geometric center of the plane of the scanning area, and P is a coordinate position (x, y) of a 3D pixel in the planar image.

7. The smart Internet high-definition scanner with laser correction according to claim 1, wherein the image processing unit divides the 3D curved surface filled with pixel value into a plurality of 3D curves according to a bending direction of the current page, arranges the pixel points on each of the plurality of 3D curves along a corresponding straight line to complete straightening of said each of the plurality of 3D curves to form a corresponding straight line segment, replaces pixel values of the points on the corresponding straight line segment with the pixel values of the points having equidistant chord length on said each of the plurality of 3D curves, so as to straighten the plurality of 3D curves to form a plurality of corresponding straight line segments, and combines the plurality of corresponding straight line segments to straighten the 3D curved surface.

8. The smart Internet high-definition scanner with laser correction according to claim 1, further comprising a communication device to transmit a flat page image corresponding to complete scanning of the current page or the planar image collected by the camera to an external device.

9. The smart Internet high-definition scanner with laser correction according to claim 1, further comprising a display.

10. The smart Internet high-definition scanner with laser correction according to claim 6, wherein the image processing unit divides the 3D curved surface filled with pixel value into a plurality of 3D curves according to a bending direction of the current page, arranges the pixel points on each of the plurality of 3D curves along a corresponding straight line to complete straightening of said each of the plurality of 3D curves to form a corresponding straight line segment, replaces pixel values of the points on the corresponding straight line segment with the pixel values of the points having equidistant chord length on said each of the plurality of 3D curves, so as to straighten the plurality of 3D curves to form a plurality of corresponding straight line segments, and combines the plurality of corresponding straight line segments to straighten the 3D curved surface.

* * * * *